United States Patent
Moon

(10) Patent No.: US 10,492,227 B2
(45) Date of Patent: Nov. 26, 2019

(54) APPARATUS AND METHOD SUPPORTING RANDOM ACCESS FOR MASSIVE CONNECTIVITY

(71) Applicants: Samsung Electronics Co., Ltd, Suwon-si (KR); Hanyang University Industry-University Cooperation Foundation, Seoul (KR)

(72) Inventor: Hichan Moon, Seoul (KR)

(73) Assignees: Samsung Electronics Co., Ltd., Suwon-si (KR); Hanyang University Industry-University Cooperation Foundation, Seoul (KR)

( * ) Notice: Subject to any disclaimer, the term of this patent is extended or adjusted under 35 U.S.C. 154(b) by 0 days.

(21) Appl. No.: 15/914,771

(22) Filed: Mar. 7, 2018

(65) Prior Publication Data
US 2018/0263053 A1    Sep. 13, 2018

(30) Foreign Application Priority Data
Mar. 8, 2017  (KR) .................... 10-2017-0029667

(51) Int. Cl.
| H04W 74/08 | (2009.01) |
| H04W 74/00 | (2009.01) |
| H04W 4/70 | (2018.01) |
| H04W 4/08 | (2009.01) |
| H04W 4/50 | (2018.01) |

(52) U.S. Cl.
CPC ......... *H04W 74/0833* (2013.01); *H04W 4/08* (2013.01); *H04W 4/70* (2018.02); *H04W 74/002* (2013.01); *H04W 4/50* (2018.02)

(58) Field of Classification Search
CPC . H04W 74/00; H04W 74/002; H04W 74/006; H04W 74/004; H04W 74/008; H04W 74/08; H04W 74/0833; H04W 28/0226
See application file for complete search history.

(56) References Cited

U.S. PATENT DOCUMENTS

| 2011/0292893 | A1 | 12/2011 | Lee et al. | |
| 2012/0196608 | A1* | 8/2012 | Ting | H04W 74/085 455/450 |
| 2013/0130689 | A1* | 5/2013 | Cherian | H04W 52/228 455/436 |

* cited by examiner

*Primary Examiner* — Ashley Shivers

(57) ABSTRACT

The present disclosure relates to 5G or pre-5G communication systems that support higher data rates after 4G communication systems such as the LTE system. In the future, high-mobility terminals and low-mobility terminals will coexist in the massive connectivity environment of a mobile communication system. In such an environment, there is proposed a method of performing random access in different ways depending on the type of a terminal. More specifically, a method for a terminal may include: determining the mobility type of the terminal; and transmitting one of random access packets of different classes to the base station according to the determined mobility type.

20 Claims, 15 Drawing Sheets

(a)

(b)

APPARATUS AND METHOD SUPPORTING RANDOM ACCESS FOR MASSIVE CONNECTIVITY

CROSS-REFERENCE TO RELATED APPLICATION(S)

This application is based on and claims priority under 35 U.S.C. § 119 to Korean Patent Application No. 10-2017-0029667 filed on Mar. 8, 2017, in the Korean Intellectual Property Office, the disclosure of which is incorporated by reference herein in its entirety.

TECHNICAL FIELD

The present disclosure relates to a wireless communication system. More particularly, the present disclosure relates to an apparatus and method for transmitting a signal for random access.

BACKGROUND

Since commercial deployment of 4G communication systems, to meet the ever increasing demand for wireless data traffic, efforts have been made to develop improved 5G or pre-5G communication systems. As such, 5G or pre-5G communication systems are also called "beyond 4G network" or "post LTE system".

To achieve higher data rates, 5G communication systems consider utilization of the mmWave band (e.g. 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multipoints (CoMP), reception interference cancellation, and the like.

Advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

In general, to provide a wireless communication service to the user, the terminal performs random access to connect to a higher-layer node (e.g. base station). Random access is a procedure for a terminal to connect to a base station to perform wireless communication in a wireless communication system. When initial access or handover is used, the terminal may determine a suitable base station and perform random access with the determined base station. For example, in mobile communication systems such as Wideband Code Division Multiple Access (WCDMA) and LTE of 3GPP, and CDMA2000 of 3GPP2, a random access channel is defined, and random access is performed through the random access channel.

Meanwhile, the Internet is evolving from a human centered network where humans create and consume information into the Internet of Things (IoT) where distributed elements or things process and exchange information. There has also emerged the Internet of Everything (IoE) technology that combines IoT technology with big data processing technology through connection with cloud servers.

To realize IoT services, base technologies such as sensing, wired/wireless communication and network infrastructure, service interfacing and security are needed, and technologies interconnecting things such as sensor networks, machine-to-machine (M2M) or machine type communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

In addition, various attempts are being made to apply high-speed communication technologies to IoT networks. For example, attempts have been made to apply techniques such as beamforming, multiple input multiple output (MIMO), and antenna arrays to IoT networks.

A terminal in an IoT environment often transmits a small amount of data over a long period. For example, an electric meter, which transmits user's power usage through a wireless channel to a higher-layer node (e.g. server), may transmit small data of several bits composed of power usage information and ID information of the meter to the higher-layer node. Such a meter may be more useful in rural areas where the number of users using the communication service is relatively small. Since the area with a small number of users using the communication service has a relatively small infrastructure (e.g. base station), the distance between the infrastructure and the meter may be relatively long.

Even when a small amount of data is to be transmitted, the MTC terminal such as an electric meter must perform random access to the base station to transmit the data. When the distance between the meter and the base station is relatively long, the meter must transmit a random access signal at a high transmission power to transmit a small amount of data to the remote base station. Additionally, when the distance between the meter and the base station is relatively long, the meter may have to repeatedly transmit a random access signal in order to succeed in random access.

Such a random access signal repeatedly transmitted at a high power may cause interference to other terminals and base stations trying to perform random access. In addition, when the distance between the base station and the meter is relatively long, the signal transmitted by the meter or base station may be heavily influenced by the channel condition between the base station and the meter. In the case of a signal for random access, the meter may have to adaptively transmit the signal for random access according to the state of the channel between the base station and the meter.

SUMMARY

Aspects of the present disclosure are to address at least the above mentioned problems and/or disadvantages and to provide at least the advantages described below. Accordingly, an aspect of the present disclosure is to provide a method enabling a plurality of terminals to efficiently perform random access.

Another aspect of the present disclosure is to provide an apparatus that can support different random access procedures for multiple terminals according to their types for efficient random access.

In accordance with an aspect of the present disclosure, there is provided a method for a terminal. The method may include: determining the mobility type of the terminal; and transmitting one of random access packets of different classes to a base station according to the determined mobility type.

In accordance with another aspect of the present disclosure, there is provided a method for a base station. The method may include: receiving a first-class random access packet from a terminal; generating a response message to be transmitted to the terminal based on mobility type information of the terminal included in the first-class random access packet; and transmitting the generated response message to the terminal.

In accordance with another aspect of the present disclosure, there is provided a terminal. The terminal may include: a wireless communication unit configured to transmit and receive a radio signal; and a controller configured to determine the mobility type of the terminal and control the wireless communication unit to transmit one of random access packets of different classes to a base station according to the determined mobility type.

In accordance with another aspect of the present disclosure, there is provided a base station. The base station may include: a wireless communication unit configured to receive a first-class random access packet from a terminal; and a controller configured to generate a response message to be transmitted to the terminal based on mobility type information of the terminal included in the first-class random access packet, and control the wireless communication unit to transmit the generated response message to the terminal.

In a feature of the present disclosure, the terminals may perform random access to the base station by using packets of different forms according to their mobility types. Hence, random access can be efficiently performed in an environment where a plurality of terminals try to connect at the same time.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
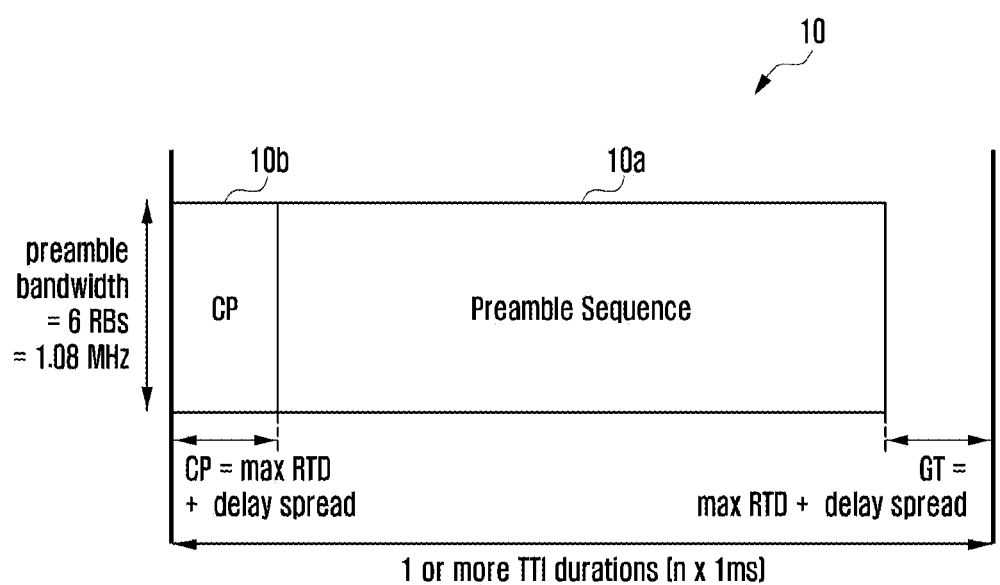
FIG. 1A illustrates the structure of a packet for a random access request transmitted by a terminal in the 3GPP LTE system.

FIGS. 1A through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure are described in detail with reference to the accompanying drawings. Detailed descriptions of well-known functions and structures incorporated herein may be omitted to avoid obscuring the subject matter of the present disclosure. Particular terms may be defined to describe the disclosure in the best manner. Accordingly, the meaning of specific terms or words used in the specification and the claims should be construed in accordance with the spirit of the disclosure.

The following description is focused on long term evolution (LTE) systems. However, it should be understood by those skilled in the art that the subject matter of the present disclosure is applicable to other communication systems having similar technical backgrounds and channel configurations without significant modifications departing from the scope of the present disclosure.

The aspects, features and advantages of certain embodiments of the present disclosure will be more apparent from the following detailed description taken in conjunction with the accompanying drawings. The description of the various embodiments is to be construed as exemplary only and does not describe every possible instance of the present disclosure. It should be apparent to those skilled in the art that the following description of various embodiments of the present disclosure is provided for illustration purpose only and not for the purpose of limiting the present disclosure as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

For ease of description, the following description employs terms and names defined in the standards such as Wideband Code Division Multiple Access (WCDMA) and Long Term Evolution (LTE) of the 3rd Generation Partnership Project (3GPP). However, the present disclosure is not limited thereto or thereby, and may be applied to other systems based on different standards.

One of the most important requirements of 5G wireless communication systems is massive connectivity. The most important reason why massive connectivity is used is IoT devices or services. Massive connectivity may mean that there can be up to millions of terminals in a cell, and the wireless communication system provides a way for them to connect to the base station. Since it is very difficult for these terminals to remain in the connected state on dedicated channels at the same time, data is transmitted through random access in most cases. In this case, however, the complexity of the base station can be greatly increased in relation to the random access. In addition, when a terminal performs random access, identity (ID) information of the terminal must be transmitted. When a large number of terminals are present in a cell, transmission of ID information can be a great burden on random access.

Meanwhile, many terminals in the IoT environment are not highly mobile. For example, electronic products and appliances in homes, devices and sensors installed in buildings and streets, and sensors for observation and measurement are generally low in mobility. If IoT services are widely available, unlike existing communication systems, it is expected that the number of terminals having low mobility or terminals requiring a communication service in fixed positions will increase sharply. In many cases, IoT terminals remain at a fixed position or operate in a limited range of areas.

In this environment, after the terminal performs the initial random access, the distance to the serving base station can be approximately calculated. Hence, when a random access signal is to be transmitted thereafter, it is possible for the terminal to transmit the random access signal at a desired time point unlike the previous transmission.

Considering this environment, in the embodiments of the present disclosure, terminals are classified according to their mobility and different random access procedures are applied according to the types of terminals. Next, the embodiments of the present disclosure are described with reference to the accompanying drawings. In the following description, random access and similar terms may be used interchangeably.

Figure 1B:
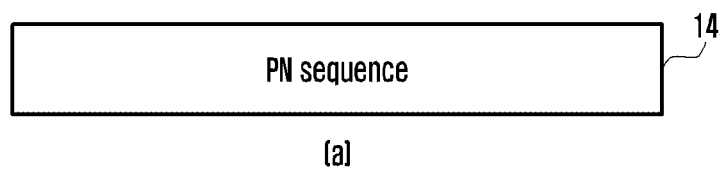
FIG. 1B illustrates the detailed structure of a packet transmitted by a terminal in the 3GPP LTE system.
Figure 1B:
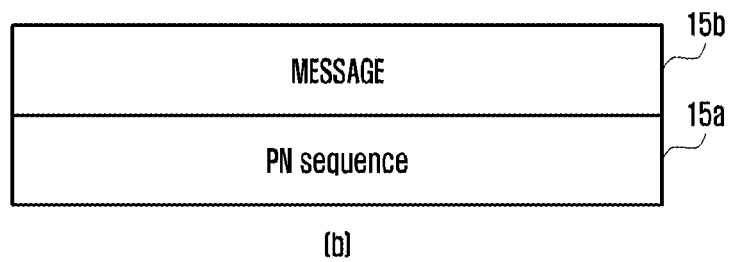

FIG. 1A illustrates the structure of a packet for random access transmitted by a terminal in the 3GPP LTE system, and FIG. 1B illustrates the detailed structure of a packet transmitted by a terminal in the 3GPP LTE system.

Part (a) of FIG. 1B illustrates a case where the packet that is transmitted by the terminal to the base station for random access is composed of one preamble 14. This is a transmission scheme commonly used for 3GPP WCDMA and LTE communication systems, and the terminal may transmit a preamble as a random access request to notify the base station of presence of data to be transmitted. In return, to enable the terminal to transmit the data, the base station may transmit the terminal a response assigning a predetermined uplink channel to the terminal.

Part (b) of FIG. 1B illustrates a case where the packet that is transmitted by the terminal to the base station for random access is composed of one preamble 15a and a short message 15b. Here, the short message 15b may include simple information such as a cause for random access, the amount of data to be transmitted, and a portion of the ID of the terminal. In return, based on the information included in the short message, the base station may determine the amount of resources to be allocated to the terminal or the terminal to which resources are to be allocated first, and transmit the terminal a response corresponding to the determination result.

One random access packet may be transmitted in multiple slots of 1 ms. The random access packet is generally transmitted using two slots (1 ms). One random access packet is transmitted using a bandwidth of 1.08 MHz. Here, the transmitted random access packet may be composed of one preamble.

More specifically, as shown in FIG. 1A, one preamble 10 may be composed of a preamble sequence 10a and a cyclic prefix (CP) 10b prefixed to the preamble sequence 10a. The CP 10b enables the base station receiver to easily detect the preamble in the frequency domain using the FFT scheme.

When the base station performs preamble detection, the arrival time of the preamble transmitted by the terminal may be important. Since the base station cannot know the time and location at which the terminal will transmit a random access packet, the terminal transmits the random access packet according to the time synchronization of a signal received from the base station. In this case, the base station may receive the random access packet after a round trip delay (RTD) from the start of a slot.

The time at which the base station receives a random access packet depends on how far the terminal is located from the base station in the cell. Since the time at which the base station receives the random access packet from the terminal varies depending on the location of the terminal in the cell, the base station managing a cell with a large radius must perform preamble detection in consideration of the maximum round-trip delay (max RTD). That is, the base station in a cell with a large radius must detect the preamble in consideration of all possible round trip delays, the greater the radius of the cell, the higher the complexity of the base station detector.

To solve the problem caused by the increase in the complexity of the base station detector, one sequence is reused through a cyclic shift with a given period in the LTE system. If the same sequence is reused in random access through a cyclic shift, the implementation complexity of the base station can be greatly reduced. In the LTE system, CAZAC sequences are used where the total number of sequences that can be generated at a given length is limited, and one sequence is shifted and reused.

The Zadoff-Chu sequence, a type of CAZAC sequence used in the LTE system, can be represented by Equation 1 below.

$$x_u(n) = e^{-j\frac{\pi u n(n+1)}{N_{ZC}}}, 0 \le n \le N_{ZC}-1 \qquad \text{[Equation 1]}$$

Here, $N_{ZC}$ is the length of the Zadoff-Chu sequence. The sequence thus generated is cyclically shifted at regular intervals and reused. In the LTE system, the sequence may be generated using a cyclic shift by Equation 2 below.

$$x_{u,v}(n) = x_u((n+C_v) \bmod N_{ZC}) \qquad \text{[Equation 2]}$$

Here, $C_v$ is the cyclic shift and is generally given as an integer multiple of $N_{CS}$, and $N_{CS}$ is the minimum value of the cyclic shift.

Figure 2:
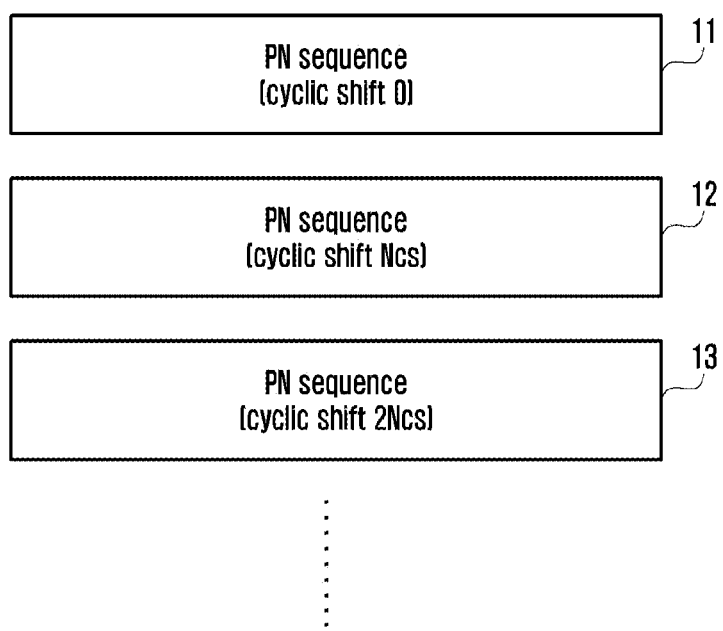
FIG. 2 shows an example of generating sequences using cyclic shift.

FIG. 2 shows an example of generating sequences using cyclic shift.

As shown in FIG. 2, one sequence 11 is designed without a cyclic shift, and the sequence 11 can be reused through cyclic shifts $N_{cs}$, $2N_{cs}$, ... corresponding to integer multiples of $N_{cs}$. For example, a new sequence 12 can be generated by applying a cyclic shift corresponding to $N_{cs}$ to the sequence 11. A new sequence 13 can be generated by applying a cyclic shift corresponding to $2*N_{cs}$ to the sequence 11. Here, the value of $N_{cs}$ is set in consideration of the radius of the cell, and is initially notified by the base station to the terminal as a system setting.

Figure 3:
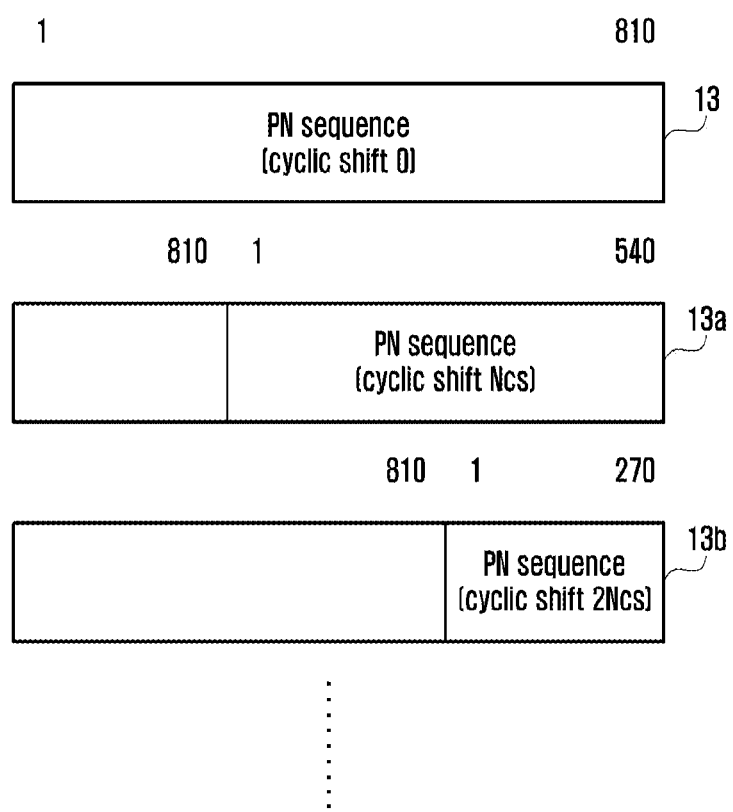
FIG. 3 shows a more detailed example of reusing preamble sequences through the Ncs value.

FIG. 3 shows a more detailed example of reusing preamble sequences through the $N_{cs}$ value.

For example, in the case of a large cell with a radius of 30 km, the round-trip delay can be as much as 200 μs. In this case, the value of $N_{cs}$ should be set to 200 μs or more so that normal operation is possible. As shown in FIG. 3, new sequences 13a and 13b can be generated by applying the $N_{cs}$ value set to 270 to the sequence 13 with a length of 810.

In a typical IoT environment, the positions of terminals are not changed (fixed) or terminals are moved within a small area during a predetermined time even if the positions thereof are changed. For example, such terminals may include electronic appliances in homes, devices and sensors installed in factories, and sensors for observation and measurement.

If random access is performed uniformly according to the existing scheme despite the small change of the terminal location, the waste of sequence resources and the sequence detection complexity of the base station can be increased. Accordingly, one embodiment of the present disclosure provides a method of classifying terminals according to the degree of position changes and performing different random access procedures according to the types of terminals.

Figure 4A:
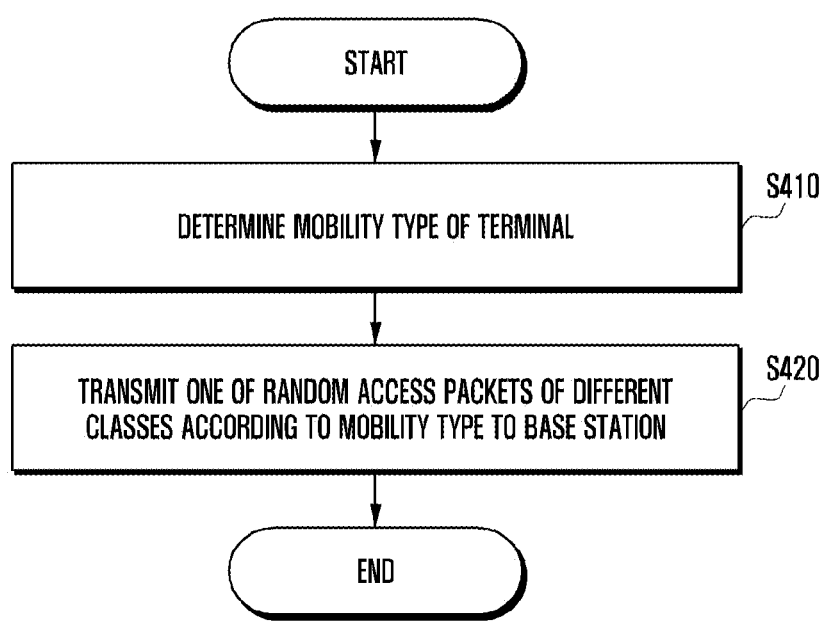
FIG. 4A is a flowchart illustrating a random access procedure of a terminal according to an embodiment of the present disclosure.
Figure 4B:
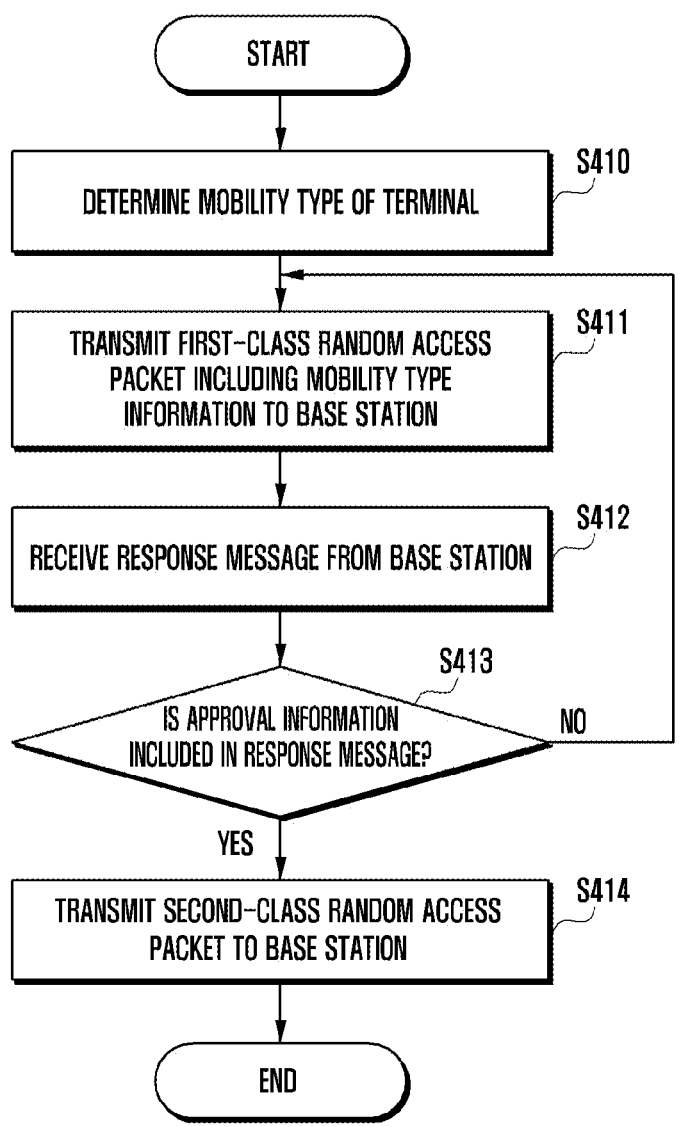
FIG. 4B is a flowchart illustrating a method of performing random access based on the type of a terminal according to an embodiment of the present disclosure.

FIG. 4A is a flowchart illustrating a random access procedure of a terminal according to an embodiment of the present disclosure. FIG. 4B is a flowchart illustrating a method of performing random access based on the type of a terminal according to an embodiment of the present disclosure.

With reference to FIG. 4A, in one embodiment, the terminal may determine the mobility type of the terminal (S410).

Here, the mobility type of a terminal can be determined according to whether the mobility of the terminal satisfies a predetermined condition. More specifically, the predetermined condition may be related to the position change of the terminal during a given time. For example, the predetermined condition may be satisfied if the position of the terminal is not changed during the given time or if the terminal is moved within a predetermined range during the given time although the position thereof is changed somewhat. For example, in one embodiment, if the predetermined condition is not satisfied (high mobility with a large position change), the terminal may be determined to be a first-type terminal. If the predetermined condition is satisfied (low mobility with a small position change), the terminal may be determined to be a second-type terminal.

Alternatively, the mobility type of a terminal can be predetermined in the terminal by, for example, the user or network operator. That is, when the position of a terminal is fixed or changes within a given range for a predetermined time, the setting of a second-type terminal may be pre-stored in the terminal. On the other hand, the terminal may directly determine its mobility type, for example, by directly detecting the position change through continuous measurement of a radio signal from the outside or by receiving a position change signal from an external equipment.

After determining the mobility type, the terminal may transmit the base station a random access packet of a class corresponding to the determined mobility type (S420).

For example, to perform random access, the terminal determined to be a first-type terminal having high mobility may transmit a random access packet of a first class to the base station; and the terminal determined to be a second-type terminal having low mobility may transmit a random access packet of a second class to the base station.

Here, the random access packet of a first class and the random access packet of a second class is a packet that is transmitted by the terminal to the base station as a random access request according to an embodiment of the present disclosure, and they may include a preamble sequence as described with reference to FIGS. 1A, 1B and 2. In this case, the first-class random access packet and the second-class random access packet may have different forms. For example, the first-class random access packet and the second-class random access packet may include different preamble sequences generated using different cyclic shifts, respectively. This is described in more detail later with reference to FIG. 6.

Meanwhile, since the base station cannot know the location of a terminal in the cell, when the terminal performs initial random access to the base station, it must transmit a first-class random access packet to the base station regardless of the mobility type. That is, even when a second-type terminal is to perform random access to the base station for the first time, it should transmit a first-class random access packet to the base station. Here, to transmit a random access packet matching the mobility type later, the first-class random access packet initially transmitted by the terminal may include mobility information of the terminal.

In other words, it is more efficient for a second-type terminal with low mobility to perform random access to the base station by transmitting a second-class random access packet. However, in the case of initial random access, the base station cannot know the location of the second-type terminal in the cell. Hence, for initial random access, the second-type terminal transmits a first-class random access packet including its mobility information to the base station. Thereafter, the second-type terminal may be allowed to transmit a second-class random access packet. Next, with reference to FIG. 4B, a description is given of an embodiment where a second-type terminal transmits a first-class random access packet for initial random access and then transmits a second-class random access packet for random access after receiving approval from the base station.

With reference to FIG. 4B, in one embodiment, the terminal may determine the mobility type thereof (S410). The terminal may transmit a first-class random access packet including the mobility type information to the base station (S411).

For example, the terminal determined to be a first-type terminal may transmit a first-class random access packet including a first-type indication to the base station; and the terminal determined to be a second-type terminal may transmit a first-class random access packet including a second-type indication to the base station.

Thereafter, the terminal may receive a response message corresponding to the first-class random access packet from the base station (S412).

Here, the response message may include grant information for granting a random access request through the first-class random access packet. In one embodiment, upon receiving a response message from the base station, the terminal can perform random access to the base station according to the response message.

Later, to perform random access again, the terminal having been determined to be a first-type terminal may transmit a first-class random access packet to the base station.

On the other hand, in addition to the grant information, the response message may include approval information allowing a second-type terminal to transmit a second-class random access packet.

Upon receiving a response message from the base station, the terminal having been determined to be a second-type terminal may determine whether approval information is included in the response message (S413).

When a response message including both grant information and approval information is received, to perform random access again later, the terminal having been determined to be a second-type terminal may transmit a second-class random access packet to the base station (S414).

In one embodiment of the present disclosure, as described above, a second-type terminal with low mobility notifies its approximate location to the base station through the initial random access. Thereafter, the second-type terminal may perform random access to the base station by using a random access packet matching the mobility type thereof. That is, this embodiment can solve a sequence waste problem that may occur when a low-mobility terminal and a high-mobility terminal perform random access using identical packets.

Figure 5:
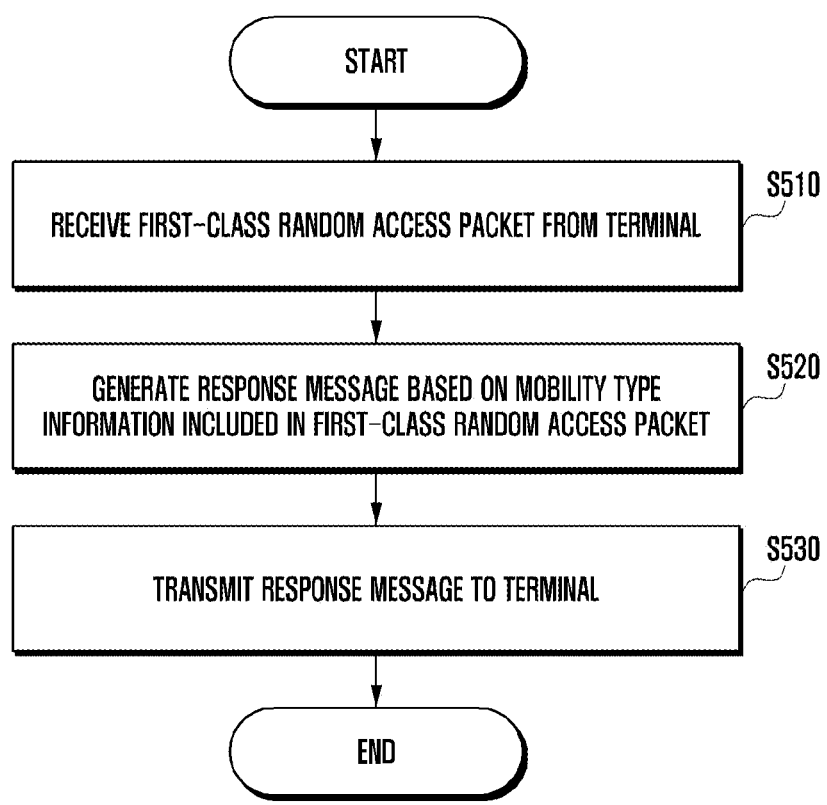
FIG. 5 is a flowchart illustrating a random access procedure of a base station according to an embodiment of the present disclosure.

FIG. 5 is a flowchart illustrating a random access procedure of the base station according to an embodiment of the present disclosure.

With reference to FIG. 5, in one embodiment, the base station may receive a first-class random access packet from a terminal (S510).

As described above in connection with FIGS. 4A and 4B, a terminal may transmit a first-class random access packet including information on the mobility type of the terminal.

Upon receiving a first-class random access packet from the terminal, the base station may identify the mobility type information of the terminal included in the first-class random access packet and generate a response message based on the mobility type information (S520).

Specifically, upon determining that the terminal is a first-type terminal based on the mobility type information included in the first-class random access packet, the base station may generate a response message including grant information permitting random access of the terminal. Upon determining that the terminal is a second-type terminal based on the mobility type information included in the first-class random access packet, the base station may generate a response message including both grant information permitting random access and approval information allowing transmission of a second-class random access packet.

Thereafter, the base station may transmit the generated response message to the terminal (S530).

As described above, the base station may examine mobility type information included in the random access packet received from a terminal, and, if the terminal is identified as a low-mobility terminal, it may allow the terminal to transmit a second-class random access packet for subsequence random access. Hence, it is possible to solve a high-complexity detection problem that may occur when a low-mobility terminal and a high-mobility terminal perform random access using identical packets.

In one embodiment, the terminal may receive system information broadcast by the base station and generate a random access packet matching the mobility type thereof based on configuration information included in the system information. For example, the system information may include information regarding the type of sequence to be generated by the terminal, a cyclic shift value, and time and frequency domain resources for random access.

More specifically, the system information may include first configuration information for generating a first-class random access packet and second configuration information for generating a second-class random access packet. Here, the first configuration information and the second configuration information may each include information regarding a sequence for requesting random access and shift information for reusing the sequence (e.g. cyclic shift value).

For example, the first configuration information may include a specific sequence and first shift information related to the sequence available to both a first-type terminal and a second-type terminal. The second configuration information may include a specific sequence and second shift information related to the sequence.

In one embodiment, the cyclic shift value corresponding to the first shift information is greater than that corresponding to the second shift information. Specifically, the cyclic shift corresponding to the shift information may be determined based on the radius of the cell. For example, when the cell radius is large, as the time delay is large, the cyclic shift cannot be used at all or should be set to a large value. When the cell radius is small, the cyclic shift may be set to a small value so that the complexity of the base station can be reduced and the sequence used for random access can be efficiently allocated.

In one embodiment, as described above, when a terminal performs random access to the base station for the first time, as its location in the cell is not known, the terminal transmits the base station a first-class random access packet generated based on the first configuration information. Once the terminal has succeeded in the initial random access, the round trip delay for the terminal is identified. Hence, for subsequent random access, if the terminal is a second-type terminal with a small position change, it may generate a second-class random access packet using shift information with a relatively small cyclic shift.

Figure 6:
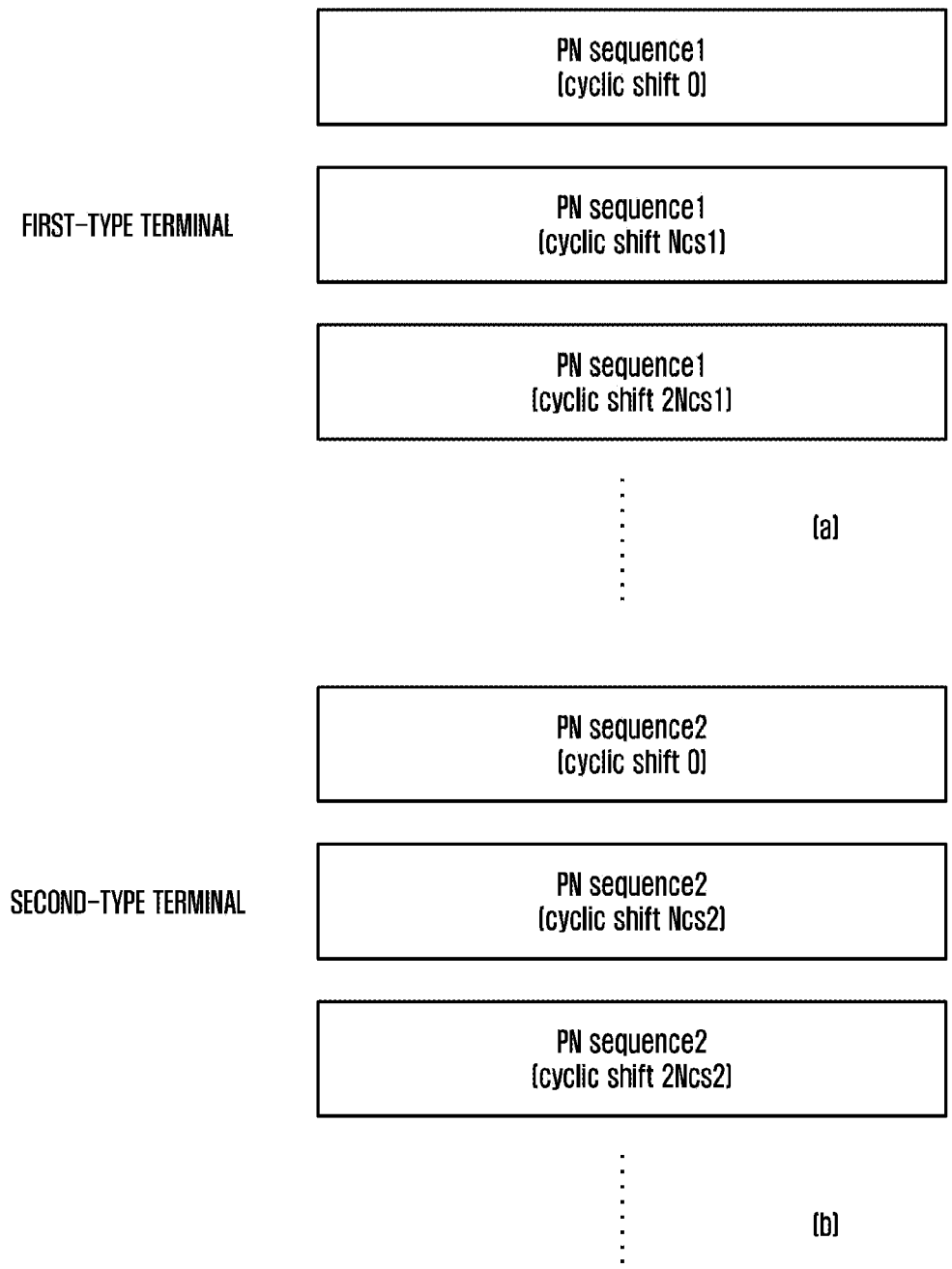
FIG. 6 illustrates generation of sequences based on the terminal types according to an embodiment of the present disclosure.

FIG. 6 illustrates generation of sequences based on the terminal types according to an embodiment of the present disclosure.

In one embodiment, as shown in FIG. 6, the terminal can generate and use different random access request messages. Part (a) of FIG. 6 shows sequences generated by reusing a given sequence based on the first shift information (Ncs1), and part (b) of FIG. 6 shows sequences generated by reusing a given sequence based on the second shift information (Ncs2).

For a more detailed example, in the case of a cell with a large radius (about 30 km), the round-trip delay can be as much as 200 µs. In this case, for the initial random access to the base station, the first shift information (Ncs1) should be set to 200 µs or more so that normal operation of the terminal is possible. Thereafter, for subsequent random access, if the terminal is a second-type terminal with a small position change, it may generate a second-class random access packet by using the second shift information (Ncs2) with a smaller cyclic shift (about 5 or 10 µs) compared with the cyclic shift of the first shift information (Ncs1).

In this example, when the length of the sequence is 810, setting Ncs2 to 10 (Ncs2=10) may have substantially the same effect as using 27 times more sequences than setting Ncs1 to 270 (Ncs1=270). Hence, in the present disclosure, it is possible to allocate a small number of sequences to terminals with a small position change, and the complexity of the base station can be significantly reduced.

In one embodiment, as described above, when the base station receives a random access request message from a terminal, the base station may identify the type of the terminal according to the degree of position change first, and transmit one of different response messages matching the type of the terminal. For subsequent random access, the terminal may directly generate a random access request message matching the type thereof. Hence, even if multiple terminals in the cell perform random access all at once, it is possible to efficiently use sequence resources.

Next, a description is given of embodiments of the present disclosure in connection with the random access procedure of the LTE system. That is, in FIGS. 7 to 9, the random access method of the present disclosure described in FIGS. 4A to 5 is illustrated in connection with the LTE-based random access procedure. In the following description, the first random access request packet and the second random access request packet may correspond to the first-class random access packet described before, and the first random access response message and the second random access response message may collectively correspond to the above-described response message of the base station. The third random access request packet may mean a random access packet transmitted for second-class random access regardless of the first random access request packet or the second random access request packet described above. When a terminal obtains an approval for utilizing second-class random access from the base station, the terminal can transmit a message using the third random access request packet other than the first random access request packet or the second random access request packet.

Figure 7:
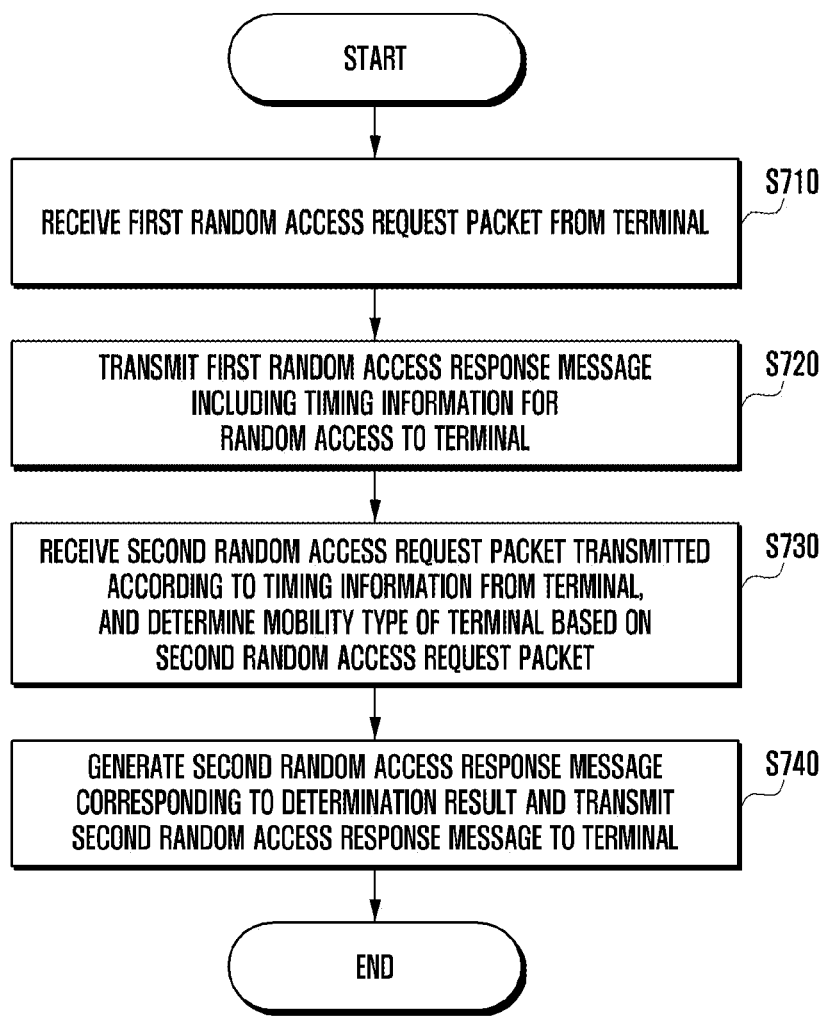
FIG. 7 is a flowchart illustrating a random access procedure performed by the base station according to the present disclosure.

FIG. 7 is a flowchart illustrating a random access procedure performed by the base station according to the present disclosure.

With reference to FIG. 7, in one embodiment, the base station may receive a first random access request packet from a terminal (S710).

Here, the first random access request packet may include a random access preamble sequence, through which the terminal transmits a random access request to the base station. The first random access request packet may include both a random access preamble sequence and a short message composed of predetermined information (e.g. the cause for random access and the amount of data to be transmitted). The first random access request packet including a random access preamble sequence may be transmitted using the initial transmission power determined based on the transmission delay, between the base station and the terminal, measured by the terminal.

Upon reception of the first random access request packet, the base station may transmit a first random access response message including timing information for random access to the terminal (S720).

In one embodiment, based on the first random access request packet received from the terminal, the base station may generate timing information indicating the timing of wireless access so that the round trip delay due to the distance between the terminal and the base station can be compensated, and transmit the first random access response message including the timing information to the terminal.

In addition, the base station may transmit additional scheduling information for wireless connection to the terminal through the first random access response message. For example, the base station may transmit a first random access response message, which includes identification information for subsequent communication of the terminal (e.g. C-RNTI (cell radio network temporary identity)), initial uplink resource allocation information for wireless access, and a power control command, to the terminal.

After transmitting the first random access response message, the base station may receive a second random access request packet transmitted according to the timing information from the terminal, and may determine the type of the terminal based on the second random access request packet (S730).

Here, the second random access request packet may be transmitted through the uplink resource allocated according to the first random access response message, and may include uplink data such as the terminal ID.

In one embodiment, for example, if the second random access request packet includes a first-type indication, the base station may determine that the terminal is a first-type terminal; and if the second random access request packet includes a second-type indication, the base station may determine that the terminal is a second-type terminal.

As another example, if the second random access request packet includes a condition satisfaction indication (a second-type indication), the base station may determine that the terminal is a second-type terminal; and if the second random access request packet does not include mobility information, the base station may determine that the terminal is a first-type terminal. Here, although the terminal is described as transmitting a second random access request packet including mobility type information, the terminal may transmit a first random access request packet including a preamble sequence and a short message as shown in FIG. 1B, in which case the short message may contain mobility type information. Upon determining the type of the terminal based on the second random access request packet, the base station may generate a second random access response message corresponding to the determination result and transmit the second random access response message to the terminal (S740).

For example, upon determining that the terminal is a first-type terminal, the base station may generate a second random access response message containing grant information permitting random access of the terminal. Here, the grant information may include information indicating successful reception of the second random access request packet, and new C-RNTI information usable by the terminal for data transmission.

Upon determining that the terminal is a second-type terminal, the base station may generate a second random access response message containing both grant information permitting random access and approval information permitting a second-type terminal to transmit a third random access request packet. The generated second random access response message may be transmitted to the terminal.

The second random access response message further containing the approval information enables a second-type terminal whose position does not change or change within a given range to perform random access in a manner different from a first-type terminal whose position is not known in the cell. This may prevent the problem of wasting the sequence or increasing the detection complexity at the base station. In other words, transmitting a second random access response message containing the approval information to the terminal may enable the terminal to perform random access in a manner matching its mobility type, increasing the efficiency of random access.

Next, operations of the terminal are described with reference to FIG. 8 in correspondence with the operations of the base station shown in FIG. 7. A repeated description will be omitted.

Figure 8:
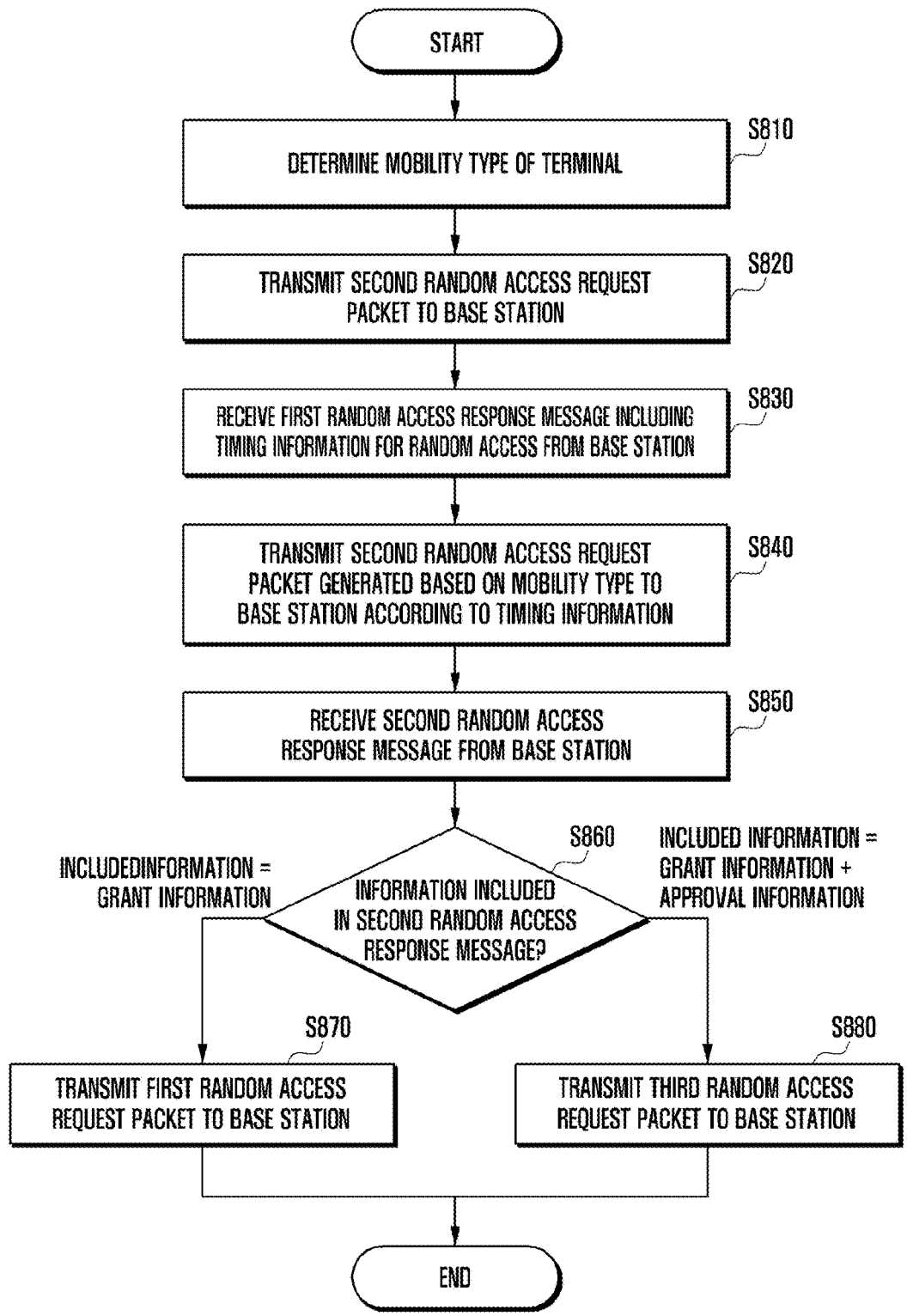
FIG. 8 is a flowchart illustrating a random access procedure performed by the terminal according to a first embodiment of the present disclosure.

FIG. 8 is a flowchart illustrating a random access procedure performed by the terminal according to a first embodiment of the present disclosure.

With reference to FIG. 8, in one embodiment, the terminal may determine the mobility type thereof (S810).

The terminal may determine that it is necessary to perform random access to the base station because there is data to be transmitted or there is no available uplink channel resource. In that case, the terminal may transmit a first random access request packet to the base station (S820).

Here, the information included in the first random access request packet or the structure of the first random access request packet is described in connection with FIG. 7.

The terminal may receive a first random access response message including timing information for random access from the base station (S830).

The terminal may transmit a second random access request packet generated based on the determined mobility type to the base station according to the timing information (S840).

For example, a first-type terminal may transmit a second random access request packet including a first-type indication to the base station, and a second-type terminal may transmit a second random access request packet including a second-type indication to the base station.

The terminal may receive a second random access response message from the base station in return to the second random access request packet (S850).

Upon receiving the second random access response message, the terminal may identify the information included in the second random access response message (S860).

For example, the second random access response message may include grant information allowing wireless access for the random access request. In that case, the terminal may establish a wireless connection to the base station and transmit data to be transmitted to the base station through the uplink. After data transmission, to request random access to the base station again, the terminal may attempt random access using the first random access request packet (S870).

As another example, the second random access response message may include both grant information and approval information permitting a second-type terminal to transmit a third random access request packet. That is, if the terminal is a second-type terminal, it may receive a second random access response message including both grant information and approval information. In this case, based on the grant information, the terminal may establish a wireless connection to the base station and transmit data to be transmitted to the base station through the uplink. Thereafter, to request random access to the base station again, based on the approval information, the terminal may generate a third random access request packet corresponding to the terminal type and transmit the third random access request packet to the base station (S880).

Meanwhile, as described in connection with FIG. 7, in one embodiment, the terminal may receive system information broadcast by the base station and generate a random access request message based on configuration information included in the system information. For example, the system information may include information regarding the type of sequence to be generated by the terminal, a cyclic shift value, and time and frequency domain resources for random access.

More specifically, the system information may include first configuration information for generating a first random access request packet and second configuration information for generating a third random access request packet corresponding to a second-type terminal. Here, the first configuration information and the second configuration information may each include information regarding a sequence for requesting random access and shift information for reusing the sequence (e.g. cyclic shift value).

For example, the first configuration information may include a specific sequence and first shift information related to the sequence available to both a first-type terminal and a second-type terminal. The second configuration information may include a specific sequence and second shift information related to the sequence.

Here, in one embodiment, the cyclic shift value corresponding to the first shift information is greater than that corresponding to the second shift information. Specifically, the cyclic shift corresponding to the shift information may be determined based on the radius of the cell. For example, when the cell radius is large, as the time delay is large, the cyclic shift cannot be used at all or should be set to a large value. When the cell radius is small, the cyclic shift may be set to a small value so that the complexity of the base station can be reduced and the sequence used for random access can be efficiently allocated.

In one embodiment, when a terminal performs random access to the base station for the first time, as its location in the cell is not known, the terminal transmits the base station a first random access request packet generated based on the first configuration information. Once the terminal has succeeded in the initial random access, the round trip delay for the terminal is identified. Hence, for subsequent random access, if the terminal is a second-type terminal with a small position change, it may generate a third random access request packet based on the shift information with a relatively small cyclic shift.

In one embodiment, as described above, when the base station receives a random access request packet from a terminal, the base station may identify the type of the terminal according to the degree of position change first, and transmit one of different response messages matching the type of the terminal. For subsequent random access, the terminal may directly generate a random access request packet matching the type thereof. Hence, even if multiple terminals in the cell perform random access all at once, it is possible to efficiently use sequence resources.

Meanwhile, in one embodiment, when the position of a second-type terminal changes, the terminal may perform random access in a different manner. This is described with reference to FIG. 9.

Figure 9:
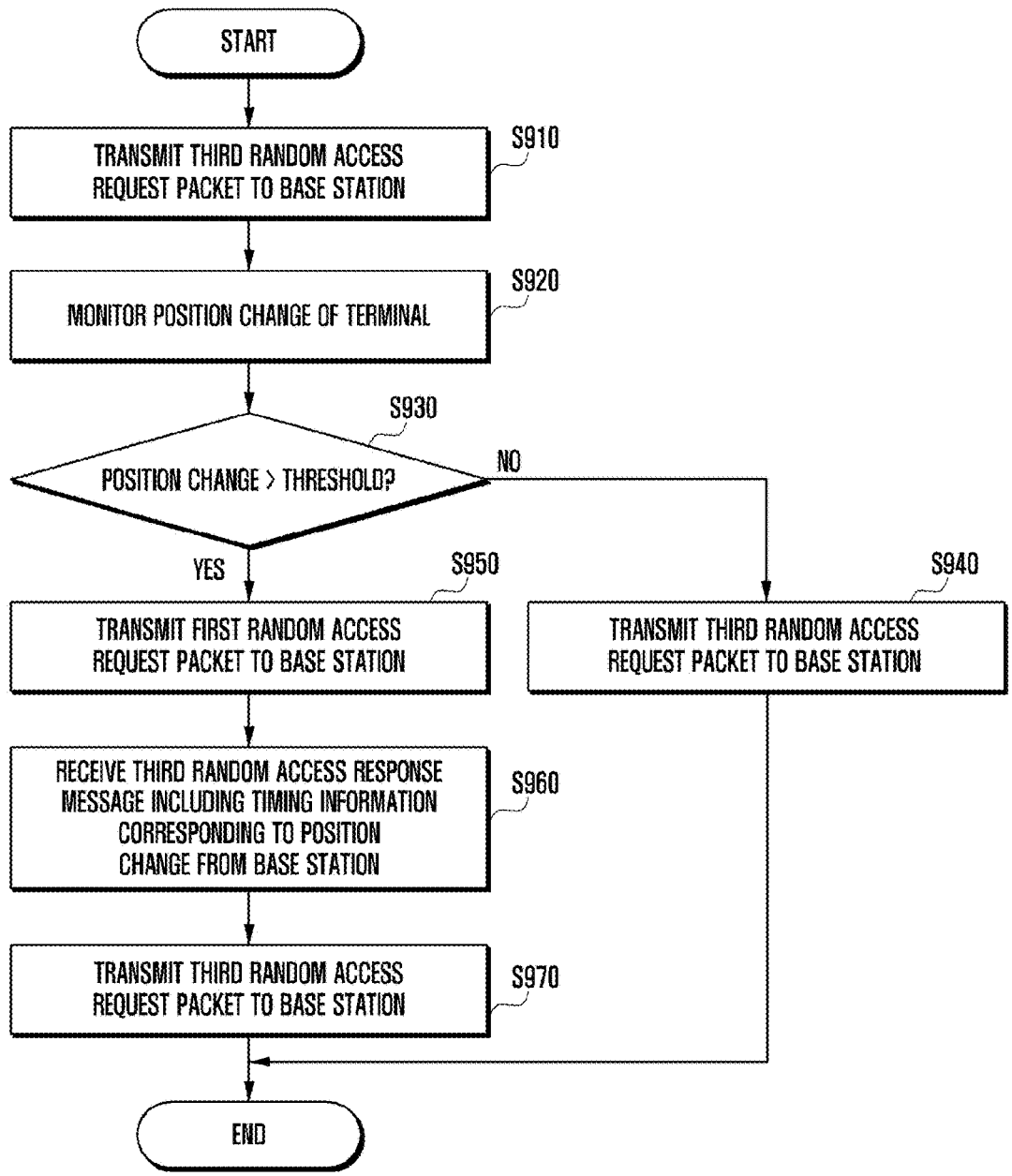
FIG. 9 is a flowchart illustrating a random access procedure performed by the terminal according to a second embodiment of the present disclosure.

FIG. 9 is a flowchart illustrating a random access procedure performed by the terminal according to a second embodiment of the present disclosure.

With reference to FIG. 9, in one embodiment, to perform random access again to the base station after successful initial random access, a second-type terminal may generate a third random access request packet and transmit it to the base station (S910).

The second-type terminal may continuously monitor whether the current position changes after the initial random access (S920).

If the current position of the second-type terminal is significantly different from the position at the initial random access, as the time delay between the base station and the second-type terminal changes, it may be difficult for the second-type terminal to perform random access through the existing third random access request packet.

Hence, the second-type terminal may determine whether the difference between the monitored current position and the initial random access position is greater than or equal to a threshold value (S930).

Here, the threshold value may be notified to the terminal through the system information broadcast by the base station. In one embodiment, upon receiving the system information, the terminal may pre-store the threshold value included in the system information.

Here, the initial random access position may be one of the position where the second-type terminal is granted the initial random access and the position where the initial random access is successful.

Upon determining that the position difference is less than the threshold value, the second-type terminal may generate a third random access request packet and transmit it to the base station in the same manner as before (S940).

Upon determining that the position difference is greater than or equal to the threshold value, the second-type terminal may generate a first random access request packet and transmit it to the base station in the same manner as for the initial random access (S950).

In this case, after the second-type terminal is moved, the second-type terminal may perform random access to the base station using the first random access request packet so that the time delay between the base station and the terminal can be estimated again at the current position. Then, the base station may generate timing information of the terminal according to the newly estimated time delay due to the position change, and transmit a third random access response message including the generated timing information to the terminal (S960).

After reception of the third random access response message from the base station, if there is no position change or the position change is within a given range, the second-type terminal may generate a third random access request packet and transmit it to the base station at the time when making a random access attempt at the new position (S970).

Here, the third random access request packet may be generated based on the second configuration information included in the system information.

As described above, when the position of the second-type terminal is significantly changed after the successful initial random access, the second-type terminal may perform random access to the base station by using a first random access request packet in the same manner as for the first random access attempt. Then, the base station may generate the timing information and the random access response message for wireless access at the new position of the terminal based on the roundtrip delay for the new position of the terminal.

In one embodiment, the first random access request packet and the second random access request packet may be included in the first-class random access packet described before. For example, the first-class random access packet may be sent by the terminal to the base station in the form of two separate packets (i.e. a first random access request packet and a second random access request packet), or in the form of a single packet composed of a first random access request packet and a second random access request packet. Similarly, the second-class random access packet may include a third random access request packet, and the response message may include a first random access response message and a second random access response message. The third random access request packet may be transmitted in the form of a single access request packet or in the form of two or more separate packets.

Meanwhile, in one embodiment, the second shift information used by a second-type terminal performing random access may include various cyclic shift values. In this embodiment, it is necessary to determine the cyclic shift to be used by the second-type terminal for generating and transmitting a random access message.

As a first option, the base station may assign a fixed cyclic shift to each second-type terminal requesting random access. In this case, since second-type terminals use different cyclic shifts for transmitting random access messages using the same sequence, collision between terminals can be avoided even if they try to perform random access at the same time.

As a second option, different cyclic shifts may be used according to the ID of the second type terminal or information of a given bits to be transmitted by the terminal. The terminal has data to be transmitted through random access, and in particular, may have information that enables the subsequent transmission process to be performed more efficiently as it is transmitted in the early stage of the random access. In this case, random access can be performed using different cyclic shifts depending on the items of information. According to this option, it is possible to reduce the number of bits of information to be transmitted through the random access process, enabling more efficient transmission.

In the following description, as an embodiment of the above option, a description is given of transmitting ID information of the terminal using different cyclic shifts. In the case of massive connectivity, there may be millions or more terminals in a cell. When many terminals perform random access, since the base station cannot identify the terminal making an access attempt in most cases, each terminal can transmit its ID information during the random access process. However, if there are millions of terminals in a cell, more than 20 bits are used to transmit ID information. When random access is made, many bits are used to transmit the ID information each time, which can be a significant burden on the system.

Figure 10:
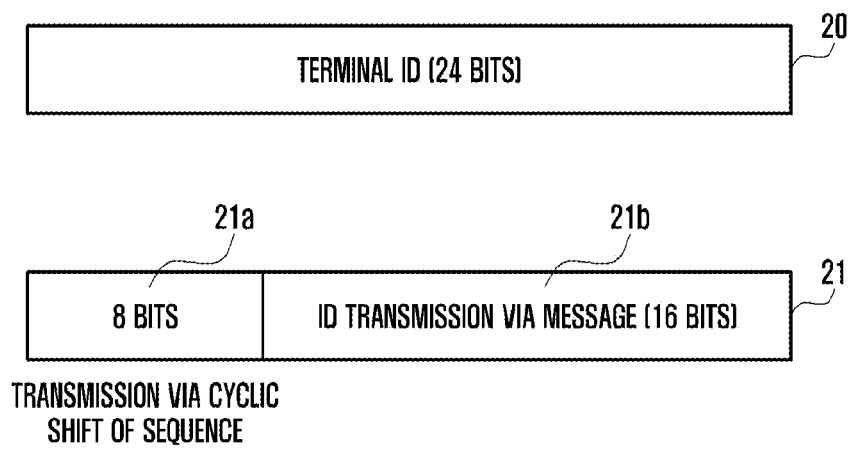
FIG. 10 shows an example of ID information of the terminal used for random access.

FIG. 10 shows an example of ID information of the terminal used for random access.

In FIG. 10, 24 bits are allocated for the ID of a terminal as indicated by indicia 20. This can be the number of ID bits assigned in one cell. The 24-bit ID can support approximately 16 million terminals. It is very inefficient to transmit 24-bit ID information every time random access is attempted, and it is helpful to reduce the number of bits.

The present disclosure proposes a scheme for transmitting a portion of ID information as a cyclic shift of the sequence to reduce the number of ID bits to be transmitted. In one embodiment of the present disclosure a portion of ID information is described as being transmitted as a cyclic shift, but it is possible to transmit information other than the ID information. Here, the information that can be transmitted may include, for example, information about the cause for random access, the priority for random access, and the amount of data to be transmitted.

In FIG. 10, a portion of the terminal ID (21) may be transmitted via a cyclic shift and the remaining portion may be transmitted via a message transmitted by the random access packet or a message to be transmitted thereafter. FIG. 10 shows an embodiment where the 8-bit ID information (21a) is transmitted through a cyclic shift and the remaining 16-bit ID information (21b) is transmitted through a subsequent message. If a portion of the ID information is transmitted through the cyclic shift, the number of bits to be actually transmitted can be reduced, enabling more efficient communication.

However, when data such as ID is transmitted through a cyclic shift, the cyclic shift transmitted by one terminal may be fixed or more terminals may attempt random access using a specific cyclic shift, increasing the possibility of collision. To solve this problem, when terminals transmit data such as ID through a cyclic shift, it is helpful to randomize the cyclic shift to be transmitted for specific data. In that case, the cyclic shift transmitted each time by the terminal for random access is changed, avoiding the collision.

Figure 11:
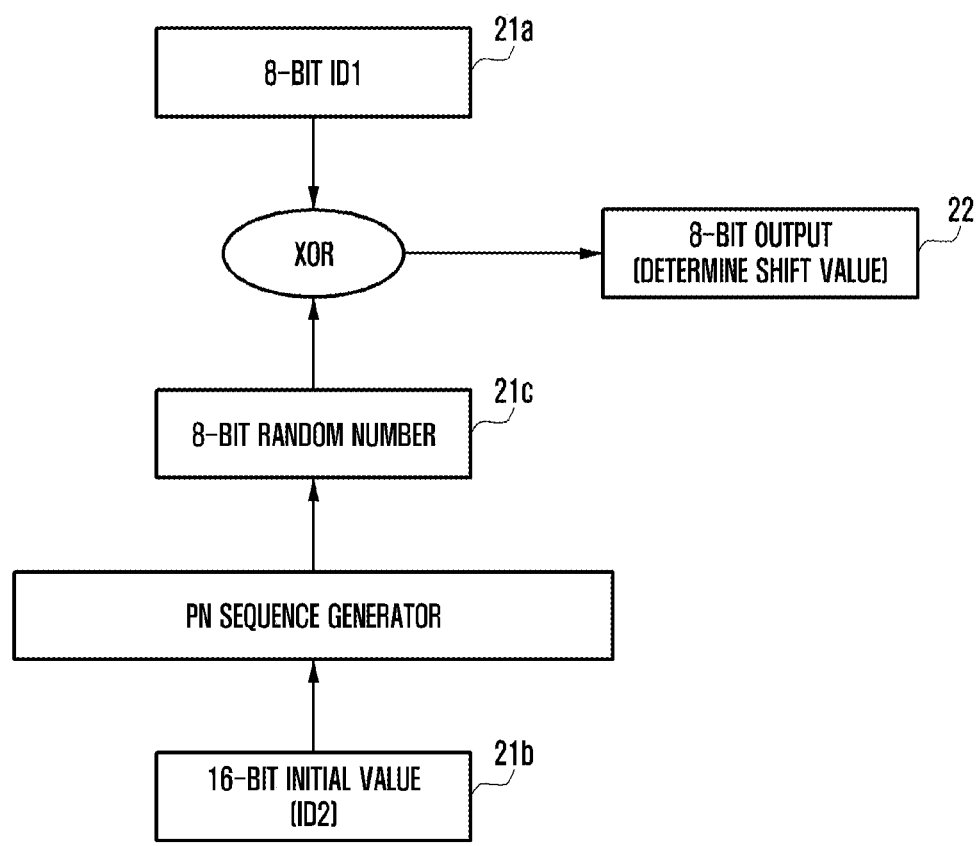
FIG. 11 illustrates randomization of the cyclic shift proposed in the present disclosure.

FIG. 11 illustrates randomization of the cyclic shift proposed in the present disclosure.

In FIG. 11, a terminal has a 24-bit ID. The 8-bit information (21a) of the 24-bit ID is transmitted through a cyclic shift and the remaining 16-bit information (21b) is transmitted through the random access process thereafter. To transmit the 8-bit information (21a) through a cyclic shift, 256 cyclic shift values are used in total. However, since the value of the ID transmitted by a terminal is often fixed, if the terminal transmits its ID via a cyclic shift, the cyclic shift of the same value is used. To prevent this problem, the value of the cyclic shift used each time can be randomized by using the remaining 16 bits (21b) of the ID. That is, even if the same information is transmitted each time using a cyclic shift or multiple terminals simultaneously transmit using a cyclic shift corresponding to the same information, the value of the cyclic shift transmitted each time can be changed via randomization.

More specifically, as shown in FIG. 11, it is possible to randomize the data to be transmitted by using a random number of 8 bits generated based on the 16-bit ID information (21b) not affecting the cyclic shift. Each terminal may include a PN sequence generator. A random number may be generated by initializing the PN sequence generator with the value of the 16-bit ID information (21b). Thereby, all terminals can generate different random numbers each time. When the 8-bit random number (21c) thus generated is XORed with the data to be transmitted through the cyclic shift, a randomized 8-bit output (22) can be determined. Thereafter, by transmitting the 8-bit output, the data to be transmitted can be randomized each time.

After receiving a random access packet, the base station may store the cyclic shift value transmitted by a terminal. The base station may receive a portion of the ID information in the subsequent random access procedure. Then, the base station may calculate the random number generated by the terminal based on the received ID information, and can find the data transmitted through the cyclic shift based on the random number and the stored cyclic shift value.

In the above description, it is assumed that the data transmitted through the cyclic shift is a portion of the ID information and the data used to generate the random number is the remaining portion of the ID information.

However, the data transmitted by the terminal via the cyclic shift and the data for generating the random number may include not only the ID information transmitted by the terminal to the base station in the random access process but also parameters indicating the characteristics of the random access (e.g. the cause for random access, the amount or priority of data to be transmitted, and the mobility type information).

Figure 12:
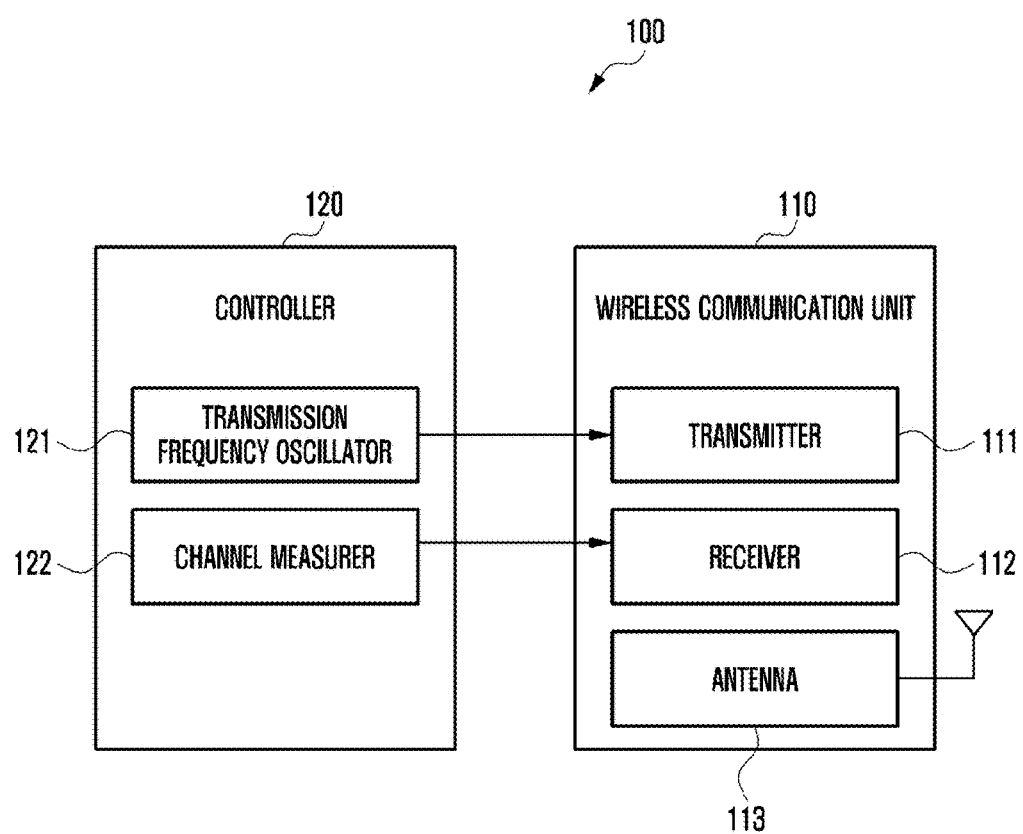
FIG. 12 is a block diagram illustrating a terminal according to an embodiment of the present disclosure.
Figure 13:
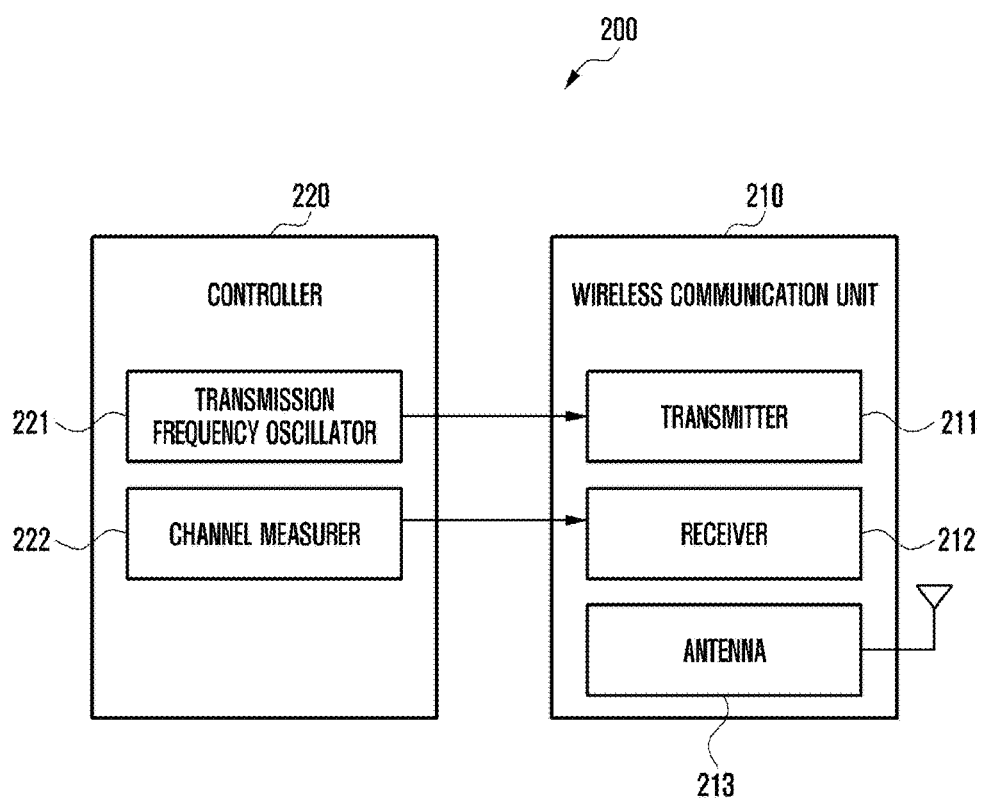
FIG. 13 is a block diagram illustrating a base station according to an embodiment of the present disclosure.

FIG. 12 is a block diagram illustrating a terminal according to an embodiment of the present disclosure, and FIG. 13 is a block diagram illustrating a base station according to an embodiment of the present disclosure.

In the description, the word "unit", "module" or the like may refer to an entity capable of carrying out at least one function or operation. A unit or the like may be implemented in software, hardware, or a combination thereof.

With reference to FIG. 12, the terminal 100 may include a wireless communication unit 110 including a transmitter 111, a receiver 112 and an antenna 113, and a controller 120 including a transmission frequency oscillator 121 and a channel measurer 122.

The antenna 113 may receive a signal through a wireless channel or transmit a signal to be transmitted by the terminal through a wireless channel. Although only one antenna is shown in FIG. 10, the terminal 100 may include a plurality of antennas.

The receiver 112 may reconstruct data from the signal received through the antenna 113. For example, the receiver 112 may include a radio frequency (RF) reception block, a demodulation block, and a channel decoding block. The reception block may include a filter and an RF preprocessor. The channel decoding block may include a demodulator, a deinterleaver, and a channel decoder.

The transmitter 111 may generate a signal to be transmitted to the base station through a random access channel under the control of the controller 120. That is, the transmitter 111 may generate a signal for carrying a message generated by the controller 120 through the random access channel. Specifically, the transmitter 111 may convert a message generated by the controller 120 into a signal to be transmitted via a radio resource to the base station through a random access channel, and output the converted signal to the antenna 113. For example, the transmitter 111 may include a signal generation block, a channel coding block, a modulation block, and an RF transmission block. The channel coding block may include a modulator, an interleaver, and a channel encoder. The RF transmission block may include a filter and an RF preprocessor.

The channel measurer 122 may estimate the downlink channel using a signal received through the receiver 112. For example, the channel measurer 122 may measure the reception power by using a reference signal received through the downlink channel.

The transmission frequency oscillator 121 may make the transmission frequency used for signal transmission by the transmitter 111 oscillate under the control of the controller 120. Although not shown, the controller 120 may further include a reception frequency oscillator to generate a signal reception frequency at the receiver 112. Generally in the FDD mode, the reception frequency and the transmission frequency are set differently.

The controller 120 may select a channel to be used to transmit a signal for random access based on the identifier of the terminal and timing information, and generate a message to be transmitted via the random access channel. The controller 120 may control the wireless communication unit 110 to transmit a signal through the random access channel. The controller 120 may be referred to as a processor or processing circuitry.

In one embodiment, the base station 200 shown in FIG. 13 may have a structure similar to that of the terminal 100 shown in FIG. 12. Thus, a repeated description is omitted.

The controller 220 of the base station 200 may obtain the ID information of a terminal through the channel used by the terminal for random access. If all the information of the terminal identifier cannot be obtained through the information on the used channel, the controller 220 can identify the terminal identifier based on information of a message transmitted afterwards and the information of the used channel.

Although not shown, the base station 200 may further include a backhaul communication unit to communicate with the core network.

The description of the various embodiments is to be construed as exemplary only and does not describe every possible instance of the present disclosure. It should be apparent to those skilled in the art that the following description of various embodiments of the present disclosure is provided for illustration purpose only and not for the purpose of limiting the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for a terminal performing random access in a wireless communication system, the method comprising:
   identifying a mobility type of the terminal;
   transmitting, to a base station, a first-class random access signal including information on the identified mobility type;
   receiving, from the base station, a first random access response message, in case that the identified mobility type is a first-type; and
   receiving, from the base station, a second random access response message including approval information permitting a transmission of a second-class random access signal, in case that the identified mobility type is a second-type.

2. The method of claim 1, further comprising:
   transmitting, in case that a mobility type of the terminal is the first-type not satisfying a predetermined condition, the first-class random access signal to the base station; and
   transmitting, in case that the mobility type of the terminal is the second-type satisfying the predetermined condition, the second-class random access signal to the base station, based on the approval information being received.

3. The method of claim 1, wherein, in case that the identified mobility type of the terminal is the second-type, the first-class random access signal is transmitted for performing an initial access procedure.

4. The method of claim 2, wherein the predetermined condition is satisfied if a position of the terminal is fixed or is changed within a given range.

5. The method of claim 1, further comprising:
   receiving system information including (i) first configuration information for generating the first-class random access signal and (ii) second configuration information for generating the second-class random access signal from the base station.

6. The method of claim 5, wherein:
the first configuration information includes a specific sequence and first shift information associated with the specific sequence to be used by the terminal of the first-type or the second-type,
the second configuration information includes the specific sequence and second shift information associated with the specific sequence to be used by the terminal of the second-type, and
a cyclic shift corresponding to the first shift information is greater than a cyclic shift corresponding to the second shift information.

7. A method for a base station performing random access in a wireless communication system, the method comprising:
receiving, from a terminal, a first-class random access signal including information on a mobility type of the terminal;
transmitting, to the terminal, a first random access response message, in case that the mobility type of the terminal is a first-type; and
transmitting, to the terminal, a second random access response message including approval information permitting a transmission of a second-class random access signal, in case that the mobility type of the terminal is a second-type.

8. The method of claim 7, further comprising:
receiving, from the terminal, in case that the mobility type of the terminal is the first-type not satisfying a predetermined condition, the first-class random access signal; and
receiving, from the terminal, in case that the mobility type of the terminal is the second-type satisfying the predetermined condition the second-class random access signal, based on the approval information being received by the terminal,
wherein the predetermined condition is satisfied if a position of the terminal is fixed or is changed within a given range.

9. The method of claim 7, further comprising:
transmitting system information including (i) first configuration information for generating the first-class random access signal and (ii) second configuration information for generating the second-class random access signal.

10. The method of claim 9, wherein:
the first configuration information includes a specific sequence and first shift information associated with the specific sequence to be used by the terminal of the first-type or the second-type,
the second configuration information includes the specific sequence and second shift information associated with the specific sequence to be used by the terminal of the second-type, and
a cyclic shift corresponding to the first shift information is greater than a cyclic shift corresponding to the second shift information.

11. A terminal for performing random access in a wireless communication system, comprising:
a transceiver configured to transmit and receive a radio signal; and
a controller configured to:
identify a mobility type of the terminal;
control the transceiver to transmit, to a base station, a first-class random access signal including information on the identified mobility type;
control the transceiver to receive, from the base station, a first random access response message, in case that the identified mobility type is a first-type; and
control the transceiver to receive, from the base station, a second random access response message including approval information permitting a transmission of a second-class random access signal, in case that the identified mobility type is a second-type.

12. The terminal of claim 11, wherein the controller is configured to:
control the transceiver to transmit, in case that a mobility type of the terminal is the first-type not satisfying a predetermined condition, the first-class random access signal to the base station; and
control, the transceiver to transmit, in case that the mobility type of the terminal is the second-type satisfying the predetermined condition, the second-class random access signal to the base station, based on the approval information being received.

13. The terminal of claim 11, wherein the controller is configured to
control the transceiver to transmit, in case that the mobility type of the terminal is the second-type, the first-class random access signal to the base station for performing an initial access procedure.

14. The terminal of claim 12, wherein the predetermined condition is satisfied if a position of the terminal is fixed or is changed within a given range.

15. The terminal of claim 11, wherein the controller further configured to control the transceiver to receive system information including (i) first configuration information for generating the first-class random access signal and (ii) second configuration information for generating the second-class random access signal from the base station.

16. The terminal of claim 15, wherein:
the first configuration information includes a specific sequence and first shift information associated with the specific sequence to be used by the terminal of the first-type or the second-type, the second configuration information includes the specific sequence and second shift information associated with the specific sequence to be used by the terminal of the second-type, and
a cyclic shift corresponding to the first shift information is greater than a cyclic shift corresponding to the second shift information.

17. A base station for performing random access in a wireless communication system, comprising:
a transceiver configured to receive a first-class random access signal from a terminal; and
a controller configured to:
control the transceiver to receive, from the terminal, a first-class random access signal including information on, a mobility type of the terminal;
control the transceiver to transmit, to the terminal, a first random access response message, in case that the mobility type of the terminal is a first-type; and
control the transceiver to transmit, to the terminal, a second random access response message including approval information permitting a transmission of a second-class random access signal, in case that the mobility type of the terminal is a second-type.

18. The base station of claim 17, wherein the controller is further configured to:
control the transceiver to receive, from the terminal, in case that the mobility type of the terminal is the first-type not satisfying a predetermined condition, the first-class random access signal;_and control the transceiver to receive, from the terminal, in case that the mobility type of the terminal is the second-type satisfying the predetermined condition the second-class random access signal, based on the approval information being received by the terminal, wherein the predetermined condition is satisfied if a position of the terminal is fixed or is changed within a given range.

19. The base station of claim 17, wherein the transceiver is configured to transmit system information including (i) first configuration information for generating the first-class random access signal and (ii) second configuration information for generating the second-class random access signal.

20. The base station of claim 19, wherein:

the first configuration information includes a specific sequence and first shift information associated with the specific sequence to be used by the terminal of the first-type or the second-type, the second configuration information includes the specific sequence and second shift information associated with the specific sequence to be used by the terminal of the second-type, and a cyclic shift corresponding to the first shift information is greater than a cyclic shift corresponding to the second shift information.

* * * * *